Nov. 15, 1927.

L. BRENNEIS

DISK HARROW

Filed July 14, 1924  3 Sheets-Sheet 1

1,649,336

INVENTOR
LOUIS BRENNEIS
BY
Graham + Nain
ATTORNEYS.

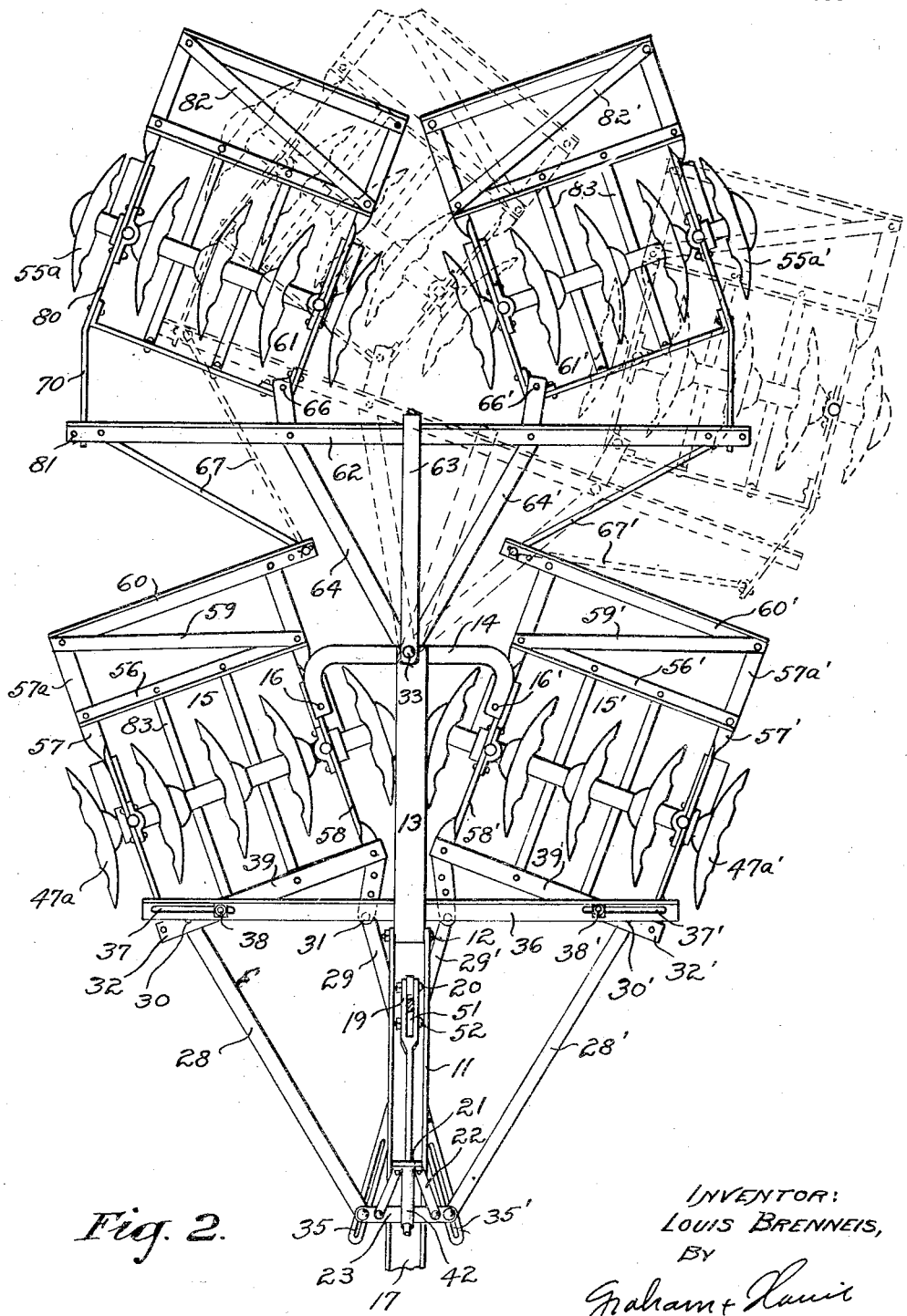

Nov. 15, 1927.
L. BRENNEIS
1,649,336
DISK HARROW
Filed July 14, 1924
3 Sheets-Sheet 3
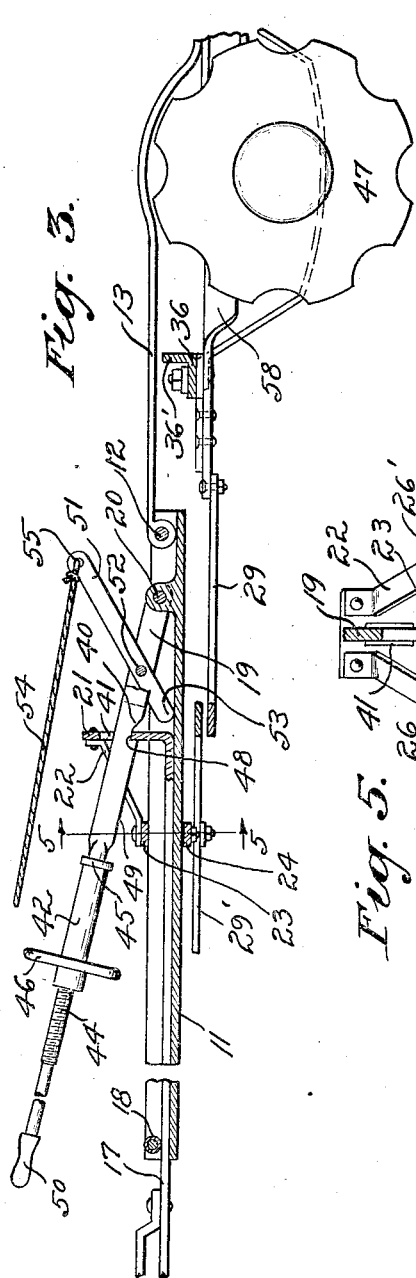
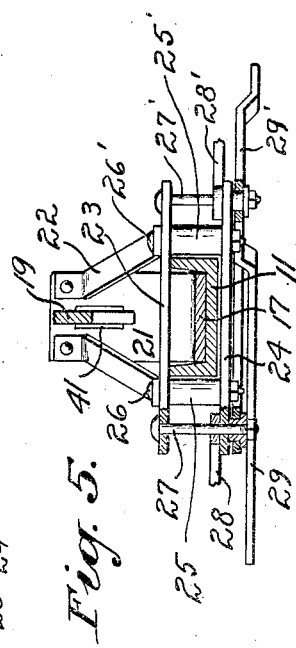
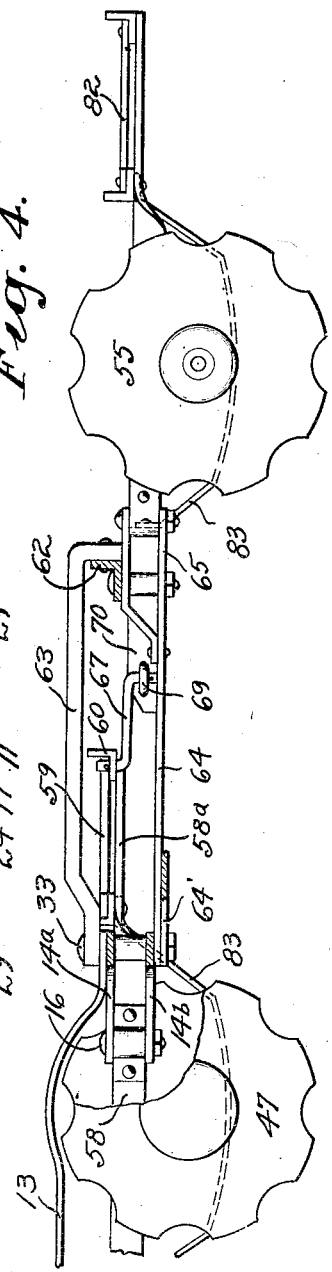
INVENTOR:
LOUIS BRENNEIS,
By
Graham + Laure
ATTORNEYS.

Patented Nov. 15, 1927.

1,649,336

UNITED STATES PATENT OFFICE.

LOUIS BRENNEIS, OF OXNARD, CALIFORNIA, ASSIGNOR TO BRENNEIS MANUFACTURING COMPANY, A CORPORATION OF CALIFORNIA.

DISK HARROW.

Application filed July 14, 1924. Serial No. 725,900.

My present invention is a disk harrow; and it is a special object of this invention to provide means adapting a disk harrow to be handled expeditiously and safely by a tractor, or the like.

It is an object of this invention to provide simple and effective means whereby the disks of a harrow may be moved to and from an inclined or digging position by the manipulation of a draw bar relatively to a frame thereof.

It is a further object of my invention to provide means facilitating a predetermination of the maximum relative inclination or "angling" of the gang sections.

Broadly, my invention comprises specific means for correlating the relative movements of the gang sections of an agricultural implement, means for conveniently predetermining the relative inclination to which said sections may be shifted, means for automatically varying the relative inclination or "angling" of rear gang sections during the rounding of corners, means for shifting the digging or other work-engaging elements thereof from a remote point, such as a driver's seat, and various combinations and subcombinations of these mentioned means.

Other objects of specific details of my invention, all parts of which may be of rigid material, will appear from the following description of an advantageous embodiment thereof, taken in connection with the appended claims and the accompanying drawings, in which Fig. 1 is a top plan view of a harrow embodying the essential features of my invention and showing the disks thereof as disposed in substantially parallel planes, as may be appropriate to the traversing of a highway, or the like, when no digging effect is intended.

Fig. 2 is a corresponding view of the same organization, but showing the disk sections, and thereby the disks therein, as relatively inclined, as for a digging effect, a relative position occupied by the sections of a rear gang during the rounding of a corner being suggested in dotted lines.

Fig. 3 is a partial vertical section substantially on the line 3—4 of Fig. 1, a break being indicated immediately at the rear of a front gang of disks.

Fig. 4 is a partial vertical section on the same line, the wheels of the front gang being, however, duplicated in this figure, in order better to indicate structural relationships hereinafter described.

Fig. 5 is a transverse vertical section substantially on the line 5—5 of Fig. 3.

Figure 1:
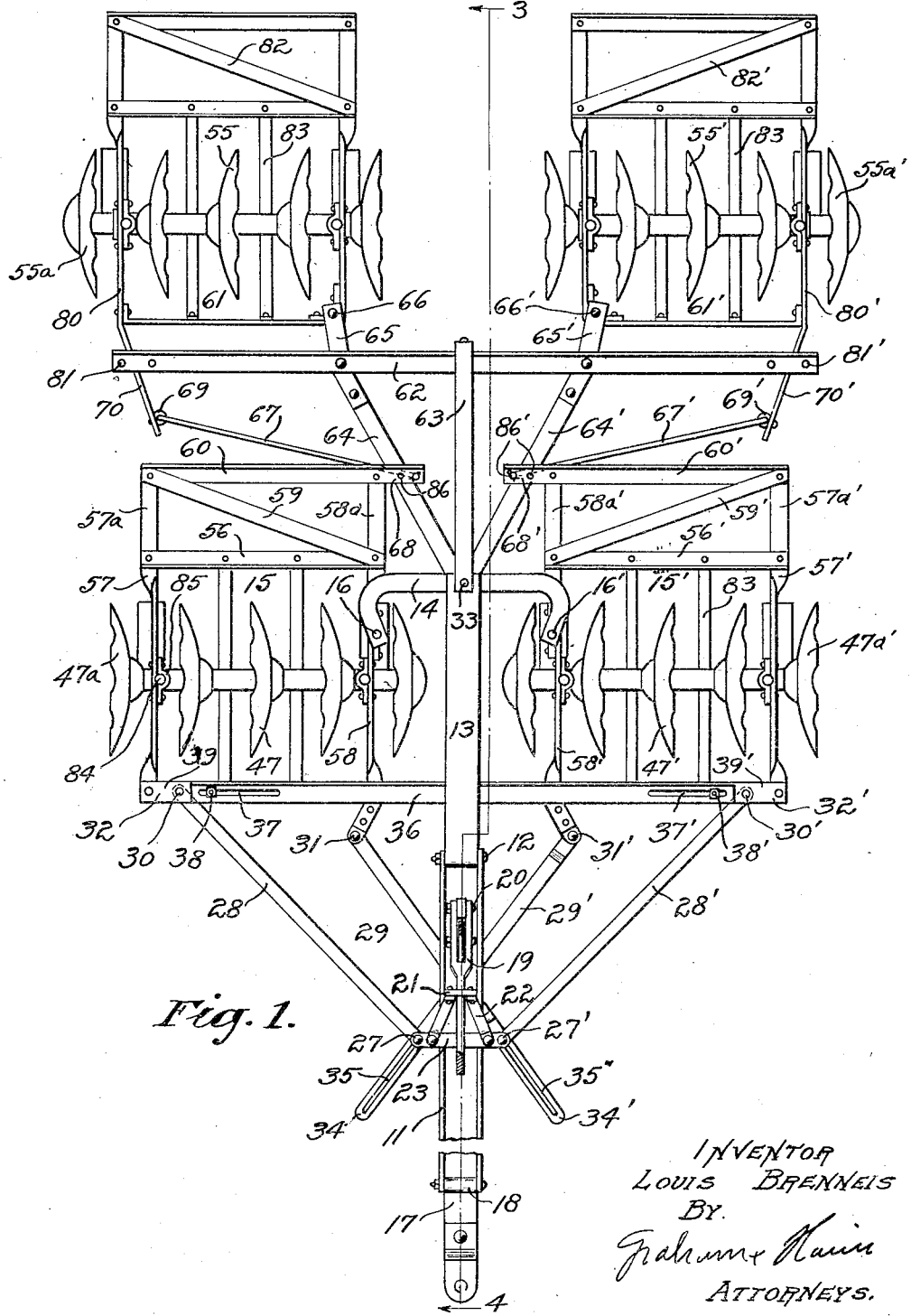

Referring to the details of that specific embodiment of my invention chosen for purposes of illustration, the main or front frame of my harrow may comprise a channel element 11 shown as pivotally connected by a pin 12 with a plate 13, to which is preferably secured a transverse bearing bracket 14, comprising plates 14$^a$ and 14$^b$, to which front gang sections 15, 15' are shown as pivotally connected at 16, 16'; and the main or front frame referred to may be secured to a draft bar 17, shown as slidable beneath a guide roller 18, by variable-hold means such as a releasable tension link or latch 19, shown as pivoted at 20 to the channel element 11 and as extending through an apertured latch plate 21, which may be integral with said draft bar.

In order that relative movement between the draft bar 17 and the main frame comprising the channel member 11 may be effective to "angle" or vary the inclination of the gang sections 15, 15', I may connect the said draft bar with any suitable angling means, for example, I may connect said draft bar, as by means of braces 22 secured to the latch plate 21, with a yoke slidable relatively to said main frame, this yoke being shown as consisting of an upper plate 23 and a lower plate 24 spaced apart by sleeves 25, 25' surrounding bolts 26, 26'. The outwardly extending ends of the plates 23, 24 may be pierced by additional bolts or pins 27, 27', serving as pivots for outer diagonal draft links 28, 28' and as guides for inner diagonal links 29, 29', the rearward ends of these links being pivotally connected at 30, 30' and 31, 31' at or near the forward corners of the gang sections 15, 15'.

Assuming the bearing bracket 14 to be rigidly connected with the plate 13, or with other elements constituting a main frame comprising the channel bar 11, or its equivalent, it will be evident that a self-righting effect may be obtained by a backward movement of the draft bar 17 (or by a relative forward movement of the said frame), the outer diagonal draft links 28, 28' then operating to push the outer corners 32, 32' of the respective gang sections into substantially the relative positions indicated in Fig. 1; and even if the bearing bracket 14 be pivotally connected, as by a pin 33, a harmonious movement of the respective gang sections may be assured by the employment of means such as the intersecting or overlapping inner diagonal links 29, 29', shown as provided at their forward ends 34, 34' with slots 35, 35', or by means such as the floating equalizer bar 36, shown as provided near its ends with slots 37, 37', through which extend bolts or pins 38, 38', secured at intermediate points in the front elements 39, 39' of the respective gang section. Either or both of the equalizing means referred to may be optionally employed, and the equalizer bar 36 may serve incidentally to limit the relative vertical pivotal movement, when such movement upon the pin 12 is permitted, by an engagement between the plate 13 and an upstanding flange 36' of said bar.

The lengths and positions of the slots 35, 35' and 37, 37' may be such as to provide absolute limits to the lateral pivotal movements of the gang sections 15, 15'; and I may employ, in connection therewith or independently thereof, any desired adjustable means to predetermine, within said limits, the "angling" of the gang sections. As best shown in Fig. 3, I may provide the rigid latch or link 19 not only with fixed engaging means such as a notch 40, adapted to cooperate with keepers such as are provided by the lower edge of a slot 41 in the latch plate 21, but also with an adjustable stop, such as the sleeve 42, threaded on an extending arm 44, shown as integral with said latch 19; and the sleeve 42 may be provided not only with means such as a collar 45, adapted to engage the latch plate 21 but with means, such as a hand wheel 46, for the adjustment of the said sleeve, thus providing a variable-hold latch means to vary the maximum angle of relative inclination of the disks 47, 47' comprised in the respective gang sections 15, 15'.

The latch 19 is automatically movable from a "long-hold" position, favorable to digging to a "short-hold" position. It should be understood that as the draft bar 17 is moved rearward longitudinally of the channel bar 11, or its equivalent, the lower edge 48 of the slot 41 in the latch plate 21 may have a camming engagement with the lower edge 49 of the latch 19, during the relative advance of the collar 45 from a position of engagement with the latch plate 21 into a relative position, such as is shown in Fig. 3; and that as soon as the latch 19 moves relatively forward a sufficient distance to permit the lower edge 48 of the slot 41 to enter the notch 40, the disks of the harrow being, incidentally to this movement, swung into the relatively parallel relationship illustrated in Fig. 1, any subsequent forward movement of the draft bar 17 must be effective simply to advance the harrow, with the said disks in their inoperative or non-digging position.

The described self-righting movement of the gang sections 15, 15' is such to facilitate the backing of a harrow for any desired distance, and it may be executed automatically and from a tractor, without requiring even the manipulation of a lever. To permit the resumption of an "angled" or digging orientation of the disks 47, 47', I may employ any suitable means for disengaging the latch 19 from the notch 40; and my disclosed means for this purpose comprises not only a hand trip 50, shown as integral with the threaded extension 44 of the latch 19, but also a rope trip lever 51, shown as pivoted to said latch plate at 52 and as having a camming engagement at 53 with the channeled frame element 11. A rope 54, shown as extending through an eye 55 at the upper end of the lever 51 may extend forward to any convenient point within reach of the driver of a tractor, or the like.

Although an organization of the general character described may be used in connection with a disk harrow provided with but a single gang of disks subdivided into sections; I may associate with a front gang of the character described a rear gang of substantially similar character but preferably provided with disks oppositely faced; and I may advantageously connect the respective gangs in such manner that the disks 55, 55' may normally be given an inclination when thrown into a digging position opposite to one another and opposite to the inclination of corresponding sets of the disks 47, 47' of the front or preceding gang. Each of the gang sections of a complete harrow embodying my invention may moreover optionally be provided with a frame serving not only to facilitate the "angling" or rectification thereof, but providing incidentally means for the support of any desired ballast.

Assuming the frames of the front gang sections 15, 15' to comprise not only the mentioned front elements 39, 39', but rear elements, 56, 56' and side elements 57, 57' and 58, 58', these side elements may be provided with bearings through which extend the mentioned pins 16, 16', pivotally connecting the sections 15, 15' with the bearing bracket 14; and the side elements 57, 57' and 58, 58' may be rearwardly extended, as at 57ª, 57ª' and 58ª, 58ª' sufficiently to provide support for the diagonals 59, 59', adapted to support ballast, the rear ends of the side elements of each section frame being shown as connected by linkage-carrying channel irons 60, 60'.

To carry the rear gang sections 61, 61', or their equivalent, I may employ means such as a rear pivot frame comprising a transverse bar 62, shown as connected by an over-arching reach 63 with the plate 13 of the main or front frame, the pin 33 serving as a pivotal connection permitting free trailing lateral movement of said pivot frame and rear gang structures relative to the main frame, and the substantial rigidity of the rear frame being assured by means such as the diagonal braces 64, 64', shown as provided with rearward extensions 65, 65' to which the rear gang sections 61, 61' may be connected as by pivots 66, 66'.

In order to impart a digging inclination to the disks 55, 55' whenever the disks of the front gang are shifted to a working position, and to restore the gang to a non-digging position whenever the disks of the front gang are restored, and incidentally to provide also for a variation in the angular relationship of the disks of the rear gang to one another in a manner favorable to the "tracking" of the rear gang in the rounding of a corner, I may connect the rear gang by means comprising the links 67, 67', shown as pivotally secured at one end to inward extensions 68, 68' of the angle bars 60, 60' at the inner rear corners of front section frames, and as extending through eyes 69, 69' on forward extensions 70, 70' at the outside front corners comprising the side elements 80, 80' of the frames of the respective rear gang sections 61, 61'. The forward extensions 70, 70' may be loosely supported and guided relatively to the transverse bar 62, as by means of U-bolts 81, 81'; and the frames of the gang sections 61, 61' may be provided with ballast carriers comprising the diagonals 82, 82', the general character of the frames of the rear gang sections being in general similar to the corresponding frames of the front gang sections, except as indicated. It will be noted that each of the rear sections 61, 61' may be regarded as movable, relatively to the rear frame, on two pivots, such as the pivots 66 and 69, the supports of both of these pivots being movable; and the connecting linkages for the movement of the same are preferably such as to give to the "inside" rear section a less inclination, relatively to the rear frame or to the line of advance thereof, than to the companion section, the relationship here referred to being favorable to a "tracking" and opposed to any cross-corner of the rear gang.

The disks, axles and bearings of my harrow may be of any usual or preferred character; but I consider it advantageous to include not less than five disks in each gang section and advantageous to extend the axles of the respective sections beyond the respective side elements of the section frames in such manner as to support outside disks 47ª, 47ª', 55ª, and 55ª' in extreme positions favorable to working at the edges of a field or near trees, or the like; and each section frame may optionally be provided with any desired means, such as the downwardly curved straps or bars 83, rigidly secured by at least one end thereof, tending to limit the descent of the disks into sandy or other loose soil. Whether or not the axles referred to are rotatably mounted, a suitable lubricant may be fed thereto, by means such as the substantially vertical passages 84, shown as formed by the attachment of channeled plates 85 to side elements of the substantially rectangular frames of the respective gang sections.

The mode of operation of my harrow has been indicated incidentally to the description of the structure thereof; but I may repeat that the angular relationship or alignment of the disks of my harrow depends primarily upon whether the latch element 19, or its equivalent, connecting the draft bar with the front or main frame occupies a "short-hold" position (as by engagement of the notch 40 with the latch plate) or a "long-hold" position (as by engagement with the collar 45 therewith) the shifts from one of these positions to the other being automatically effected by a backing movement and the opposite shift being effected either by means of a hand trip or by means of a rope trip, as described. The variable-hold latch 19 being normally held in either of the mentioned positions by gravity, an advance, after the tripping of said latch, may be automatically effective to give the respective gang sections a predetermined relative inclination, depending upon the rotative adjustment of the hand wheel 46, or equivalent means for varying the effective length of said latch; and the relative inclination between the sections of the rear gang may be further varied automatically, and substantially as shown by dotted lines in Fig. 2, by the proportioning of or adjustment of, for example, the extensions 68, 68' and 70, 70' and the links 67, 67',— for one or both ends of which links a plurality of apertures such as are shown at 86, 86' may optionally be provided.

Although, I have herein described a single complete embodiment of my invention, it should be understood that various features thereof might be independently employed and also that various modifications might be made by those skilled in the art, without the slightest departure from the spirit and scope of my invention, as the same is indicated above and in the following claims.

I claim as my invention:

1. In a disk harrow, the combination of: a main frame; gang sections pivotally movable relative thereto; angling means for said gang sections; a draft bar; and a rigid releasable tension means connecting said frame and said draft bar and comprising a variable-hold latch having a fixed stop and an adjustable stop spaced therefrom adapted to separately engage a keeper connected with said draft bar, said adjustable stop being movable to vary its spacing from the fixed stop.

2. In a disk harrow, the combination of: a main frame; front gang structures pivoted to said main frame; a draft frame movable relative to said main frame; latch mechanism for locking said main frame and said draft frame against relative movement, said latch mechanism being operable in a manner to allow relative movement between said main frame and said draft frame; front links extending between said front gang structures and said draft frame, said front links being adapted to normally retain said front gangs in non-working position and being adapted to move said front gang structures into working position when a relative movement occurs between said main frame and said draft frame; and a stabilizing frame carried by both of said front gang structures and having a slidable connection therewith, said stabilizing frame thereby giving a stability to said front gang structures.

3. In a disk harrow, the combination of: a main frame; gang sections pivotally movable relative thereto; angling means for said gang sections; a draft bar; and a rigid releasable tension means connecting said frame and said draft bar, said tension means comprising a fixed stop adapted to engage a keeper on the draft bar to maintain the gang sections in non-working position, a movable stop adapted to engage said keeper to maintain said gang structures in working position, and an element operable to move said movable stop while in engagement with said keeper, to vary the angular working positions of the gang sections.

4. In a disk harrow: a main frame; gang sections pivotally movable relative thereto; angling means for said gang sections; a draft bar; and a variable-hold latch pivoted on said frame and having an adjustable stop abutment adapted to engage said draft bar to retain said gang sections in angled working position and a fixed stop for engaging said draft bar to retain said gang sections in straight non-working positions, said latch being adapted to be self retaining on said draft bar in either of two positions.

5. In a disk harrow: a main frame; gang sections pivotally movable relative thereto; angling means for said gang sections; a draft bar; a variable-hold latch pivoted on said frame and having an adjustable stop abutment adapted to engage said draft bar to retain the gang sections in angled working position and a fixed stop for engaging said draft bar to retain said gang sections in straight nonworking positions; and means for tripping said latch.

6. In a disk harrow, the combination of: a main frame; gang sections pivotally movable relative thereto; angling means for said gang sections; a draft bar; and a rigid releasable tension means connecting said frame and said draft bar and having provisions for varying its effective length.

7. In a ground working implement, the combination of: a main frame; a draft bar, front gang structures associated with said main frame; means intermediate said draft bar and said front gang structures for angling said gang structures; a transverse pivot frame pivotally attached at a point intermediate its ends to said main frame and free to swing in a horizontal plane; a pair of rear gang structures pivoted respectively at their inner ends to said pivot frame; and connections between the front gang structures and respective rear gang structures by which said rear gang structures may be angled coincident to the angling of the front gang structures, said connections being arranged so that a lateral swing of the main frame and front gang structure relative to the pivot frame will cause each rear gang structure to swing on its individual pivot to an inclination different from that due to the angling adjustment of the companion front gang structure.

8. In a ground working implement, the combination of: a main frame; a draft bar, front gang structures associated with said main frame; means intermediate said draft bar and said front gang structures for angling said gang structures; a transverse pivot frame pivotally attached at a point intermediate its ends to said main frame and free to swing in a horizontal plane; a pair of rear gang structures pivoted respectively at their inner ends to said pivot frame; and connections between the inner ends of the front gang structures and the outer end of each respective rear gang structure by which said rear gang structures may be angled coincident to the angling of the front gang structures, said connections being arranged so that a lateral swing of the main frame and front gang structure relative to the pivot frame will cause the rear gang structures to swing on their respective pivots in opposite directions relative to said pivot frame to an inclination different from that due to the angling adjustment of the companion front gang structure.

9. In a ground working implement, the combination of: a main frame; a draft bar, front gang structures associated with said main frame; means intermediate said draft bar and said front gang structures for angling said gang structures; a transverse pivot frame pivotally attached at a point intermediate its ends to said main frame and free to swing in a horizontal plane; a pair of rear gang structures of substantially rectangular form each carrying a set of ground working implements, said rear gang structures each having an inner corner portion thereof pivoted to said pivot frame; and connections between an outer corner portion of each rear gang structure and an inner corner portion of each front gang structure by which said rear gang structures may be angled coincident to the angling of the front gang structures, said connections being arranged so that a lateral swing of the main frame and front gang structures relative to the pivot frame will cause the rear gang structures to swing upon their respective pivots in opposite directions relative to said pivot frame to an inclination different from that due to the angling adjustment of the companion front gang structure.

10. In a disk harrow: a front gang; a rear gang; angling means for said gangs; rigid means for righting said gangs incidentally to a backing movement and independently of the ground; means whereby an advance, subsequent to a backing movement, is effective to transport the harrow with the disks thereof in a non-digging position; means comprising a trip operable from a distance for restoring the disks at will to digging position; and adjustable means for predetermining the digging inclination to which the disks are restored.

11. In an agricultural implement, the combination of: gang sections capable of being relatively inclined, shifting means therefor, and means comprising a main frame, a rigid tension element secured to said frame, an adjustable stop on said tension element and a hand wheel on said adjustable stop for predetermining the inclination to which said sections may be shifted.

12. In an agricultural implement: front and rear gang sections; means for varying the relative inclination of the rear gang section incidentally to the rounding of a corner; means for automatically causing said gang sections to shift toward a parallel relationship incidentally to a backing movement; and means for automatically causing the retention of a rectified position of said gang sections during an advance subsequent to the backing movement.

13. In a ground working implement the combination of: a main frame; front gang structures associated with said main frame; a transverse pivot frame pivotally attached at a point intermediate its ends to said main frame and free to swing in a horizontal plane; a pair of rear gang structures pivoted respective to said pivot frame; a draft frame movable relative to the main frame; connections between the draft frame and the front gang structures and between said front and rear gang structures whereby movement of the said draft frame relative to the main frame will swing all of the gang structures to and from annular working positions; and releasable means for retaining the draft frame in selective positions relative to the gang frame, said connections permitting automatic gradual movement of the respective rear gang structures to change their positions relative to each other when the implement is turned from a straight to a curved path, and independently of relative movement of the draft and main frames.

In testimony whereof, I have hereunto set my hand at Los Angeles, California, this 9th day of July, 1924.

LOUIS BRENNEIS.